(12) United States Patent
Thompson et al.

(10) Patent No.: US 7,896,121 B2
(45) Date of Patent: Mar. 1, 2011

(54) AUTOMOTIVE FUEL STORAGE SYSTEM WITH IN-TANK FUEL ENCAPSULATION SYSTEM

(75) Inventors: Robert Thompson, Redford, MI (US); Joseph Dierker, Jr., Troy, MI (US)

(73) Assignee: Ford Global Technologies, Dearborn, MI (US)

( * ) Notice: Subject to any disclaimer, the term of this patent is extended or adjusted under 35 U.S.C. 154(b) by 977 days.

(21) Appl. No.: 11/621,584

(22) Filed: Jan. 10, 2007

(65) Prior Publication Data

US 2008/0164262 A1    Jul. 10, 2008

(51) Int. Cl.
B60K 28/14 (2006.01)
A62C 3/07 (2006.01)
B60K 15/077 (2006.01)

(52) U.S. Cl. .................. 180/271; 180/284; 180/282; 220/4.14; 220/562; 169/62; 169/66; 169/68; 169/70; 137/351; 137/590; 701/45

(58) Field of Classification Search .............. 180/271, 180/282, 284; 137/351, 352, 590; 220/4.14, 220/4.15, 562; 701/45; 123/529; 169/62, 169/66, 68, 70; 239/337
See application file for complete search history.

(56) References Cited

U.S. PATENT DOCUMENTS

| | | | | |
|---|---|---|---|---|
| 1,347,057 A * | 7/1920 | Ross | .............. | 169/46 |
| 2,693,240 A * | 11/1954 | William Gerald et al. | ..... | 169/45 |
| 2,718,330 A * | 9/1955 | Adamson | ............. | 220/88.3 |
| 3,084,292 A * | 4/1963 | Hunt | .............. | 329/367 |
| 3,174,550 A * | 3/1965 | Bugg | .............. | 169/44 |
| 3,237,894 A * | 3/1966 | Wight, Jr. | .............. | 244/129.2 |
| RE26,020 E * | 5/1966 | Powell | .............. | 169/66 |
| 3,583,593 A * | 6/1971 | Merritt | .............. | 220/560.02 |
| 3,876,011 A * | 4/1975 | Poitras | .............. | 169/57 |
| 3,924,773 A * | 12/1975 | Wilkinson | .............. | 220/88.3 |
| 4,088,193 A * | 5/1978 | Colgate | .............. | 169/45 |
| 4,177,863 A * | 12/1979 | Simon | .............. | 169/62 |
| 4,286,070 A * | 8/1981 | DiGiulio et al. | .............. | 521/88 |
| 4,338,246 A * | 7/1982 | Halpern | .............. | 524/100 |

(Continued)

FOREIGN PATENT DOCUMENTS

DE    20011086 U1    *    12/2000

OTHER PUBLICATIONS

Manuela Kopf, Apparatus for Preventing Fire Accidents in Fuel-operated Motor Vehicles of all Types by Means of Secondary Fuel Tank Safety Device, Dec. 21, 2000, German Patent Office, De 200 11 086 U1, Hand Translation of Description.*

Primary Examiner—Paul N Dickson
Assistant Examiner—James English
(74) Attorney, Agent, or Firm—Jerome R. Drouillard; Frank MacKenzie

(57) ABSTRACT

An automotive fuel tank storage system includes a fuel storage tank installed in a vehicle and a barrier fluid tank containing a supply of barrier fluid. A distribution system connected with the barrier fluid tank and with the fuel storage tank distributes barrier fluid about the outer periphery of the fuel contained within the storage tank in the event of a collision event, creating a boundary layer of more viscous fluid which inhibits exfiltration of the fuel from the fuel storage tank.

14 Claims, 3 Drawing Sheets

U.S. PATENT DOCUMENTS

| | | | | |
|---|---|---|---|---|
| 4,383,579 A * | 5/1983 | Monk | | 169/62 |
| 4,633,967 A * | 1/1987 | Kranz | | 180/274 |
| 4,676,463 A * | 6/1987 | Tansill | | 244/129.2 |
| 4,702,322 A * | 10/1987 | Richardson | | 169/28 |
| 5,026,735 A * | 6/1991 | Stern | | 521/50 |
| 5,316,558 A * | 5/1994 | Gonzalez | | 44/340 |
| 5,531,290 A * | 7/1996 | Furuichi et al. | | 180/271 |
| 5,840,632 A * | 11/1998 | Miller | | 442/62 |
| 6,346,574 B1 * | 2/2002 | Nishihara | | 525/132 |
| 6,528,544 B2 * | 3/2003 | Stern et al. | | 516/10 |
| 2004/0046403 A1 * | 3/2004 | DePottey et al. | | 293/118 |
| 2005/0118106 A1 * | 6/2005 | Schaefer | | 424/45 |
| 2006/0253240 A1 * | 11/2006 | Rao et al. | | 701/48 |
| 2007/0045026 A1 * | 3/2007 | Theisen | | 180/274 |
| 2007/0108348 A1 * | 5/2007 | Peters | | 244/135 R |
| 2007/0119605 A1 * | 5/2007 | Williams | | 169/68 |

* cited by examiner

AUTOMOTIVE FUEL STORAGE SYSTEM WITH IN-TANK FUEL ENCAPSULATION SYSTEM

BACKGROUND OF THE INVENTION

1. Field of the Invention

The present invention relates to a system for coating the interior walls of a fuel tank with a barrier fluid in the event of a potential fuel-spill emergency, so as to encapsulate fuel within the tank and inhibit the flow of fuel from the tank.

2. Disclosure Information

Police vehicles are subject to increased exposure to collisions, particularly high-speed rear-end collisions, arising from the need for police officers to stop on the shoulders, or even in the traffic lanes, of busy highways. Unfortunately, other motorists are known to collide with police vehicles employed in this manner. These accidents can compromise the fuel system on any vehicle and may cause fires. The present system is intended to suppress the spread of fuel which could feed such a fire.

SUMMARY OF THE INVENTION

According to an aspect of the present invention, an automotive fuel storage system includes a fuel storage tank installed in a vehicle, and a barrier fluid tank containing a supply of barrier fluid. A distribution system, connected with the barrier fluid tank and with the fuel storage tank, distributes barrier fluid in a laminar flow about the outer periphery of fuel contained within the storage tank, creating a boundary layer of more viscous fluid, such that exfiltration of fuel from the fuel storage tank will be inhibited. The barrier fluid tank may be located externally to the fuel storage tank or internally within the fuel storage tank.

According to another aspect of the present invention, barrier fluid is constituted as a viscous, flowable fluid having a vapor pressure less than that of motor gasoline. Barrier fluid may include a viscosity modifier such as ethylene-propylene copolymers or styrene-butadiene copolymers. Further, the barrier fluid preferably has a flammability less than the flammability of gasoline.

As used herein, the term "barrier fluid" means a flowable fluid, which, upon being introduced between the inner surfaces of a fuel tank and liquid fuel within the tank, creates a boundary layer of more viscous fluid which inhibits free flow of the fuel, such as gasoline, through a breach in a damaged tank wall.

According to another aspect of the present invention, the barrier fluid may include a hydrocarbon liquid thickened with a metallic soap. Barrier fluid may also include polymethacrylate.

According to another aspect of the present invention, a fuel storage system includes a pressure relief valve mounted in a wall of the fuel storage tank.

According to another aspect of the present invention, a controller for triggering the discharge of a propellant within the barrier fluid tank preferably employs pre-crash sensing such as radar or ultrasonic detection, so as to deploy the fuel encapsulation system early during a collision sequence.

It is an advantage of the present automotive fuel storage system that encapsulation of the fuel will inhibit exfiltration of fuel through a damaged tank such as that occurring during a collision, so as to lessen the fire risk from the fuel contained within the tank.

Other advantages, as well as features of the present invention will become apparent to the reader of this specification.

DETAILED DESCRIPTION OF THE PREFERRED EMBODIMENTS

Figure 1:
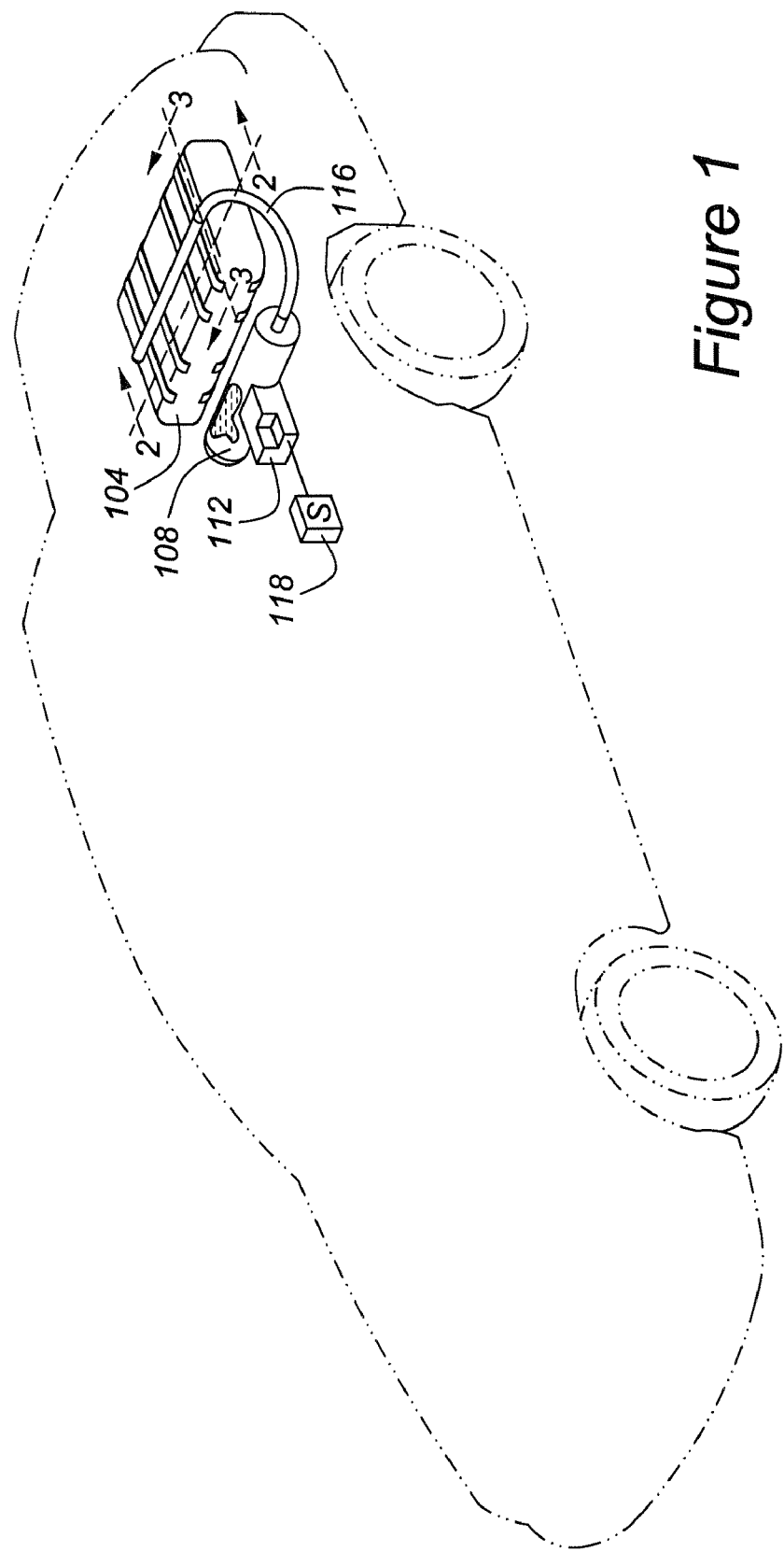
FIG. 1 is a perspective view of a vehicle having an automotive fuel storage system with an encapsulation system according to the present invention.
Figure 2:
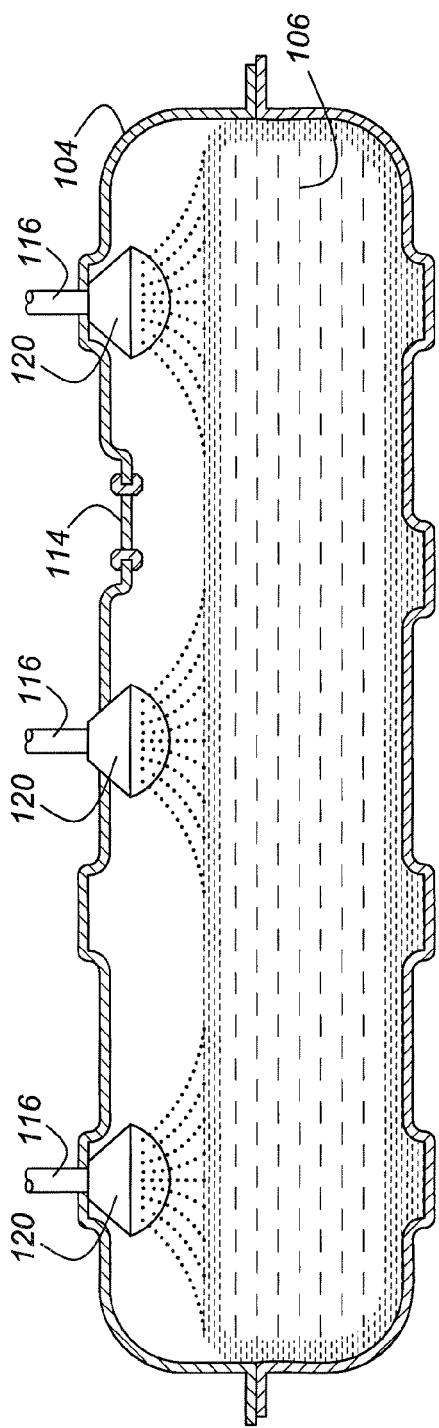
FIG. 2 is a sectional view, partially in elevation, of the fuel tank shown in FIG. 1, taken along the line 2-2 of FIG. 1.
Figure 3:
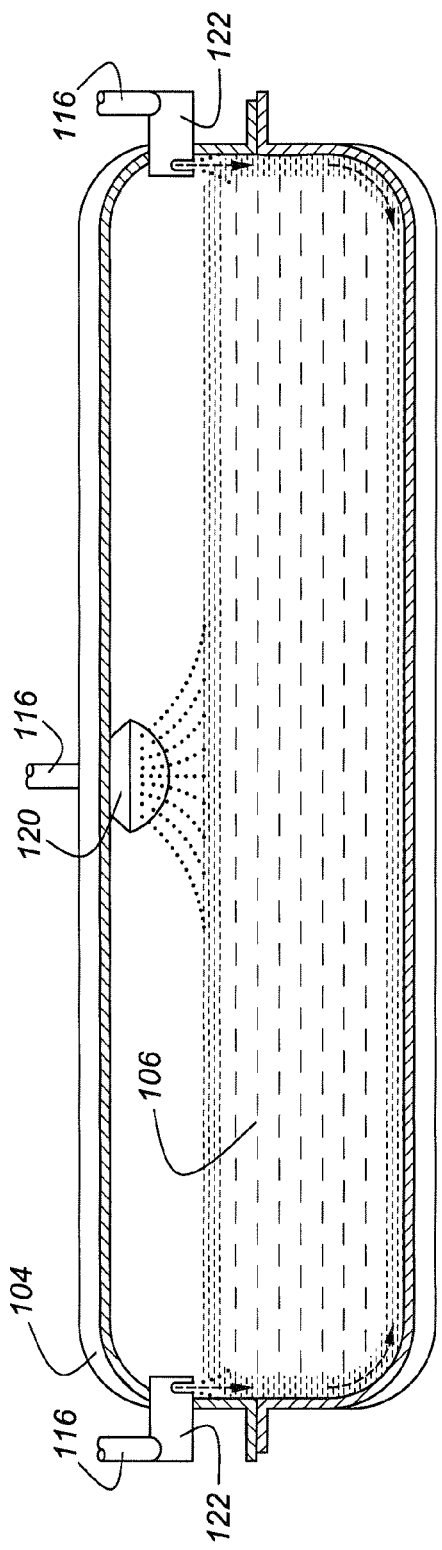
FIG. 3 illustrates the fuel tank of FIG. 1, taken along the line 3-3 of FIG. 1.
Figure 4:
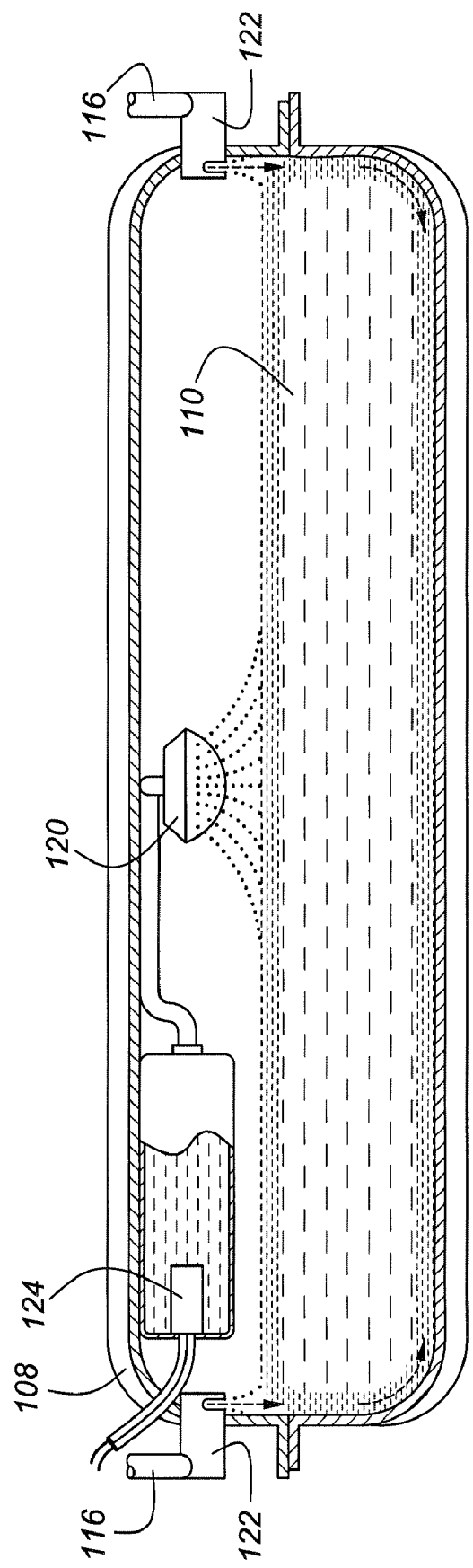
FIG. 4 is similar to FIG. 3 but shows a system in which a barrier fluid tank is contained within the fuel storage tank itself.

As shown in FIG. 1, vehicle 100 has a fuel storage tank, 104, containing a quantity of fuel 106 therein (FIGS. 2, 3, 4). Barrier fluid tank 108 is situated externally of fuel tank 104 in FIG. 1 and upon command from controller 112, barrier fluid 110 will be flowed into fuel tank 104 by means of a distribution system including manifold 116 and a number of flow nozzles 120, which are shown in FIGS. 2-4. Flow nozzles 120 include not only wide angle fan nozzles 120, but also, wall nozzles 122, which cause barrier fluid to flow tangentially along the walls of fuel tank 104. The action of wall nozzles 122, when combined with wide angle spray nozzles 120 effectively coat the outer surface of the fuel with barrier fluid 110, encapsulating the fuel within the tank. In essence, flow nozzles 120 and 122 are located and configured so as to distribute barrier fluid in a tangential flow along at least some of the interior surfaces of said fuel storage tank. Flow nozzles 120 and 122 do not function like injector nozzles because the pressure, nozzle flow pattern, and viscosity of the barrier fluid cause do not cause barrier fluid 110 to bore into the fuel; rather, barrier fluid 110 coats all of the outer surfaces of the fuel volume with a boundary layer which is more viscous than the fuel.

By increasing the localized viscosity of the fluid within a boundary layer at the tank walls, barrier fluid 110 inhibits the exfiltration, or flow, of fuel through a breach which might erupt through a fuel tank wall due to a collision. Barrier fluid 110 may comprise any of a number of viscosity increasing fluids known to those skilled in the art such as greases or other hydrocarbon liquids thickened with either metallic soap, or viscosity modifiers such as polymethacrylate, styrene-butadiene, or ethylene-propylene copolymers. What is important is that the barrier fluid be introduced quickly into the fuel tank so as to coat the surface of the fuel during a collision event. If the fuel is prevented from leaving the tank for only a few seconds at the beginning of a collision event, the chances of avoiding a fire are greatly improved.

If desired, barrier fluid tank 108, including propellant 124, may be mounted within fuel tank 104, as shown in FIG. 4. If internal mounting is chosen, manifolding 116 may also be placed internally within fuel tank 104 as well. Regardless of the location of propellant 124, burst disc 114 (FIG. 2) limits over pressurization of tank 104 when barrier fluid 110 is introduced.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive fuel storage system, comprising:
   a fuel storage tank installed in a vehicle with said tank containing a quantity of fuel;
   a barrier fluid tank having a reservoir containing a supply of barrier fluid and a propellant for expelling the barrier fluid from said reservoir;
   a controller for triggering the discharge of said propellant wherein said controller comprises a pre-crash sensing system; and
   a distribution system, connected with said barrier fluid tank and with said fuel storage tank, for distributing barrier fluid in a boundary layer about the outer periphery of said fuel contained within said storage tank, such that exfiltration of the fuel from the fuel storage tank will be inhibited.

2. An automotive fuel storage system according to claim 1, wherein said barrier fluid tank is located externally to said fuel storage tank.

3. An automotive fuel storage system according to claim 1, wherein said barrier fluid tank is located within said fuel storage tank.

4. An automotive fuel storage system according to claim 1, wherein said barrier fluid comprises a viscous, flowable fluid having a vapor pressure less than that of motor gasoline.

5. An automotive fuel storage system according to claim 4, wherein said barrier fluid comprises a viscosity modifier.

6. An automotive fuel storage system according to claim 1, wherein said distribution system comprises a plurality of flow nozzles located so as to distribute said barrier fluid in a tangential flow along at least some of the interior surfaces of said fuel storage tank.

7. An automotive fuel storage system according to claim 1, wherein said barrier fluid comprises a liquid having a viscosity greater than the viscosity of gasoline, and a flammability less than the flammability of gasoline.

8. An automotive fuel storage system according to claim 7, wherein said barrier fluid comprises a hydrocarbon liquid thickened with a metallic soap.

9. An automotive fuel storage system according to claim 1, wherein said barrier fluid comprises ethylene-propylene copolymers.

10. An automotive fuel storage system according to claim 1, wherein said barrier fluid comprises styrene-butadiene copolymers.

11. An automotive fuel storage system according to claim 1, wherein said barrier fluid comprises polymethacrylate.

12. An automotive fuel storage system according to claim 1, wherein said pre-crash sensing system comprises a radar detector.

13. An automotive fuel storage system according to claim 1, wherein said pre-crash sensing system comprises an ultrasonic detector.

14. An automotive fuel storage system according to claim 1, further comprising a manual control for initiating the discharge of barrier fluid into said fuel storage tank.

* * * * *